US012639652B2

(12) United States Patent
He et al.

(10) Patent No.: US 12,639,652 B2
(45) Date of Patent: May 26, 2026

(54) AUTOMATICALLY BUILDING BUSINESS INTELLIGENCE MODELS

(71) Applicant: Microsoft Technology Licensing, LLC, Redmond, WA (US)

(72) Inventors: Yeye He, Bellevue, WA (US); Yiming Lin, Irvine, CA (US); Surajit Chaudhuri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 18/134,999

(22) Filed: Apr. 14, 2023

(65) Prior Publication Data

US 2024/0346427 A1      Oct. 17, 2024

(51) Int. Cl.
| | |
|---|---|
| *G06Q 10/067* | (2023.01) |
| *G06F 16/21* | (2019.01) |
| *G06F 16/2453* | (2019.01) |
| *G06F 16/2458* | (2019.01) |

(52) U.S. Cl.
CPC ......... *G06Q 10/067* (2013.01); *G06F 16/212* (2019.01); *G06F 16/24544* (2019.01); *G06F 16/2465* (2019.01)

(58) Field of Classification Search
CPC .............. G06Q 10/067; G06F 16/2465; G06F 16/24544; G06F 16/212
See application file for complete search history.

(56) References Cited

U.S. PATENT DOCUMENTS

| | | | | |
|---|---|---|---|---|
| 10,795,895 | B1 * | 10/2020 | Taig .................. | G06F 16/24578 |
| 2010/0325054 | A1 * | 12/2010 | Currie .................... | G06Q 10/10 |
| | | | | 705/301 |
| 2012/0136684 | A1 * | 5/2012 | Pulido De Los Reyes ................ | |
| | | | | G06Q 10/067 |
| | | | | 705/348 |
| 2018/0173750 | A1 * | 6/2018 | Dumant .............. | G06F 16/2448 |
| 2019/0378074 | A1 * | 12/2019 | Mcphatter ........... | G06Q 10/067 |
| 2021/0158176 | A1 | 5/2021 | Wan | |
| 2024/0311623 | A1 * | 9/2024 | Rossi ....................... | G06N 3/08 |

OTHER PUBLICATIONS

Pavlo, et al., "A Comparison of Approaches to Large-Scale Data Analysis", In Proceedings of the ACM SIGMOND International Conference on Management of data, Jun. 29, 2009, 14 Pages.
Rostin, et al., "A Machine Learning Approach to Foreign Key Discovery", In Proceedings of WebDB, Jun. 28, 2009, 6 Pages.
Karger, et al., "A Randomized Linear-Time Algorithm to Find Minimum Spanning Trees", In Journal of the ACM, vol. 42, Issue 2, Mar. 1, 1995, pp. 321-328.

(Continued)

*Primary Examiner* — Hares Jami
(74) *Attorney, Agent, or Firm* — Ray Quinney & Nebeker P.C.; Tiffany B. Healy

(57) ABSTRACT
The present disclosure relates to methods and systems that automatically predict a business intelligence model for tables of data provided as input. The methods and systems automatically generate a graph representing the business intelligence model and provide the graph as output. The graph provides a visual representation of the business intelligence model with nodes of the graph representing each input table and edges of the graph representing weighted edges joining pairs of tables together.

16 Claims, 6 Drawing Sheets

(56) References Cited

OTHER PUBLICATIONS

Land, et al., "An Automatic Method for Solving Discrete Programming Problems", In Journal of 50 Years of Integer Programming 1958-2008: From the Early Years to the State-of-the-Art, Nov. 1, 2010, pp. 105-132.

Chaudhuri, et al., "An Overview of Business intelligence Technology", In Journal of Communications of the ACM, vol. 54 , Issue 8, Aug. 1, 2011, pp. 88-98.

Li, et al., "Auto-FuzzyJoin: Auto-Program Fuzzy Similarity Joins Without Labeled Examples", In Proceedings of the 2021 International Conference on Management of Data, Jun. 20, 2021, pp. 1064-1076.

Zhu, et al., "Auto-Join: Joining Tables by Leveraging Transformations", In Journal of Proceedings of the VLDB Endowment, vol. 10, Issue 10, Jun. 1, 2017, pp. 1034-1045.

Yan, et al., "Auto-Suggest: Learning-to-Recommend Data Preparation Steps Using Data Science Notebooks", In Proceedings of the ACM SIGMOD International Conference on Management of Data, Jun. 14, 2020, pp. 1539-1554.

Guruswami, et al., "Beating The Random Ordering Is Hard: Every Ordering Csp Is Approximation Resistant", In Journal of SIAM Journal on Computing, vol. 40, Issue 3, Jun. 1, 2011, pp. 878-914.

Funke, et al., "Benchmarking Hybrid OLTP&OLAP Database Systems", In Journal of Datenbanksysteme für Business, Technologie und Web (BTW), Jan. 1, 2011, pp. 390-409.

Negash, et al., "Business Intelligence", In Handbook on decision support systems 2. Springer, Sep. 22, 2008, pp. 175-193.

Escoffier, et al., "Completeness in approximation classes beyond APX", In Journal of Theoretical computer science, vol. 359, Issue 1-3, Aug. 14, 2006, pp. 369-377.

Hartmanis, Juris, "Computers and Intractability: A Guide to the Theory of NP-Completeness (Michael R. Garey and David S. Johnson)", In Journal of Siam Review, vol. 24, Issue 1, Jan. 1, 1982, pp. 90-91.

DeWitt, Davidj. , "DeWitt Clause", Retrieved From: https://en.wikipedia.org/wiki/David_DeWitt#DeWitt_Clause, Feb. 27, 2022, 2 Pages.

Rosen, Kennethh. , "Discrete Mathematics And Its Applications", In Publication of Taylor & Francis Group, Apr. 3, 2008, 524 Pages.

Marchi, et al., "Efficient Algorithms for Mining Inclusion Dependencies", In Proceedings of the International Conference on Extending Database Technology, Springer, Mar. 25, 2002, pp. 464-476.

Chen, et al., "Fast Foreign-Key Detection in Microsoft SQL Server PowerPivot for Excel", In Journal of Proceedings of the VLDB Endowment, vol. 7, Issue 13, Sep. 1, 2014, pp. 1417-1428.

Jiang, et al., "Holistic Primary Key and Foreign Key Detection", In Journal of Intelligent Information Systems, vol. 54, Issue 3, Jun. 1, 2020, pp. 439-461.

Idoine, Carlie, "How to Enable Self-Service Analytics", Retrieved From: https://www.gartner.com/en/documents/3957086, Sep. 9, 2019, 4 Pages.

Casanova, et al., "Inclusion Dependencies and Their Interaction with Functional Dependencies", In Proceedings of the 1st ACM SIGACT-SIGMOD symposium on Principles of database systems, Mar. 29, 1982, pp. 171-176.

International Search Report and Written Opinion received for PCT Application No. PCT/US2024/022916, Jun. 17, 2024, 15 pages.

Lin, et al., "Auto-BI: Automatically Build BI-Models Leveraging Local Join Prediction and Global Schema Graph," retrieve from: arXiv preprint arXiv:2306.12515, Jun. 21, 2023, 18pages.

Zhang, et al., "On Multi-Column Foreign Key Discovery", In Journal of Proceedings of the VLDB Endowment, vol. 3, Issue 1, Sep. 1, 2010, pp. 805-814.

Edmonds, Jack, "Optimum Branchings", In Journal of Research of the national Bureau of Standards, vol. 71B, Issue 4, Oct. 1, 1967, pp. 233-240.

"Power BI", Retrieved From: https://powerbi.microsoft.com/en-us/, Retrieved on: Jan. 16, 2023, 12 Pages.

Mizil, et al., "Predicting Good Probabilities With Supervised Learning", In Proceedings of the 22nd international conference on Machine learning, Aug. 7, 2005, 8 Pages.

Reimers, et al., "Sentence-BERT: Sentence Embeddings using Siamese BERT-Networks", In repository of arXiv:1908.10084v1, Aug. 27, 2019, 11 Pages.

"SentenceTransformers Documentation", Retrieved From: https://www.sbert.net/, Retrieved on: Jan. 16, 2023, 7 Pages.

Mackinlay, et al., "Show Me: Automatic Presentation for Visual Analysis", In Journal of IEEE transactions on visualization and computer graphics, Nov. 5, 2007, pp. 1137-1144.

Yang, et al., "Summarizing Relational Databases", In Journal of Proceedings of the VLDB Endowment, vol. 2, Issue 1, Aug. 24, 2009, pp. 634-645.

"Tableau", Retrieved From: https://www.tableau.com/, Retrieved on: Jan. 16, 2023, 13 Pages.

Kimball, et al., "The Data Warehouse Toolkit: The Complete Guide to Dimensional Modeling", Published by John Wiley & Sons, Aug. 8, 2011, 447 Pages.

Kronz, et al., "The Gartner 2022 Analytics & BI Platforms Magic Quadrant Highlights", Retrieved From: https://www.gartner.com/en/webinar/453533/1068121, Retrieved on: Jan. 16, 2023, 2 Pages.

Hanrahan, Pat, "VizQL: a language for query, analysis and visualization", In Proceedings of the ACM SIGMOD international conference on Management of data, Jun. 27, 2006, pp. 721-721.

Schmidt, et al., "XMark: A Benchmark for XML Data Management", In Proceedings of the 28th International Conference on Very Large Databases, Aug. 20, 2002, 13 Pages.

* cited by examiner

100

(a) Star Schema

102

(b) Snowflake Schema

104

(c) Constellation (multi-Snowflake)

500

Receiving tables of data — 502

Using a machine learning model to automatically predict a business intelligence model for the tables — 504

Outputting a graph for the business intelligence model — 506

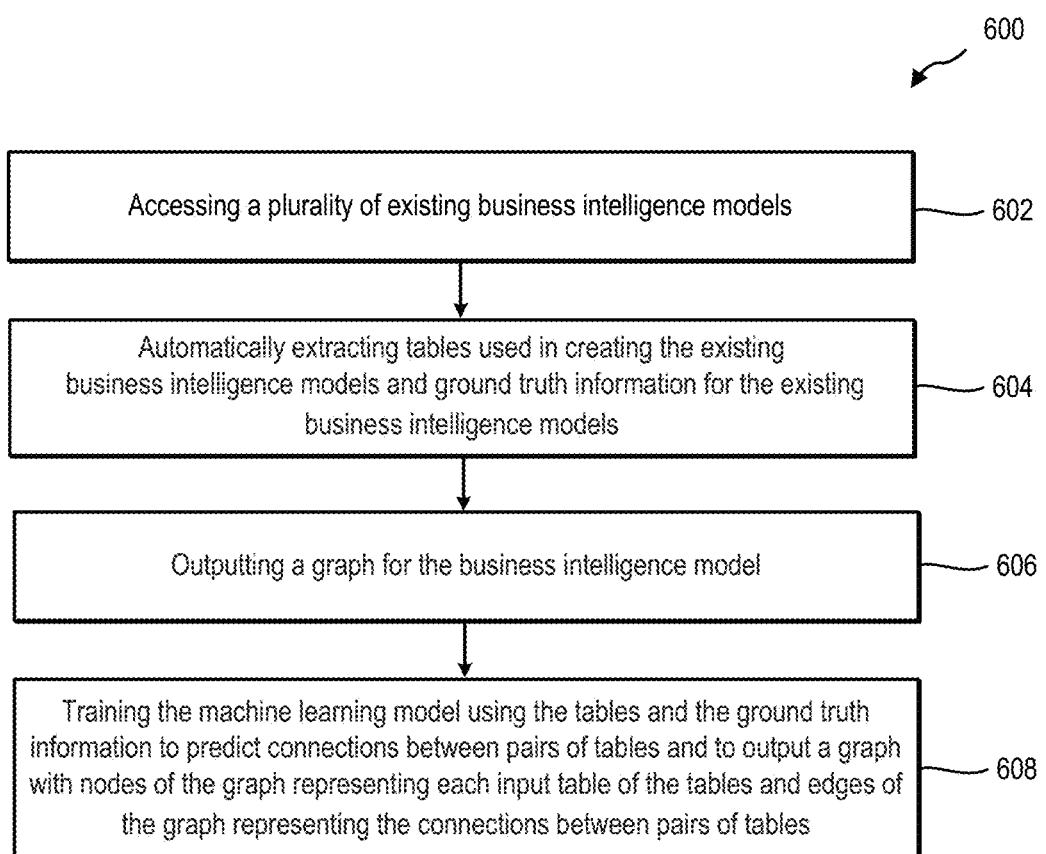

600

Accessing a plurality of existing business intelligence models — 602

Automatically extracting tables used in creating the existing business intelligence models and ground truth information for the existing business intelligence models — 604

Outputting a graph for the business intelligence model — 606

Training the machine learning model using the tables and the ground truth information to predict connections between pairs of tables and to output a graph with nodes of the graph representing each input table of the tables and edges of the graph representing the connections between pairs of tables — 608

AUTOMATICALLY BUILDING BUSINESS INTELLIGENCE MODELS

BACKGROUND

Business Intelligence (BI) is crucial in modern enterprises and is a billion-dollar business. Traditionally, technical experts (e.g., database administrators) manually prepare BI-models (e.g., in star or snowflake schemas) that join tables in data warehouses, before less technical business users can run analytics using end user dashboarding tools. However, the popularity of self-service BI products in recent years has created a demand for less technical end users to build BI-models themselves without relying on database administrators or central information technology (IT) departments.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving tables of data. The method includes using a machine learning model to automatically predict a business intelligence model for the tables, wherein the business intelligence model defines relationships between the data. The method includes outputting a graph for the business intelligence model, wherein nodes of the graph represent each input table of the tables of data and edges of the graph represent weighted edges joining pairs of tables together.

Some implementations relate to a device. The device includes a processor; memory in electronic communication with the processor; and instructions stored in the memory, the instructions being executable by the processor to: receive tables of data; use a machine learning model to automatically predict a business intelligence model for the tables, wherein the business intelligence model defines relationships between the data; and output a graph for the business intelligence model, wherein nodes of the graph represent each input table of the tables of data and edges of the graph represent weighted edges joining pairs of tables together.

Some implementations relate to a method. The method includes accessing existing business intelligence models. The method includes automatically extracting tables used in creating the existing business intelligence models and ground truth information for the existing business intelligence models. The method includes providing the tables and the ground truth information as input to a machine learning model. The method includes training the machine learning model using the tables and the ground truth information to predict connections between pairs of tables and to output a graph with nodes of the graph representing each input table of the tables and edges of the graph representing the connections between pairs of tables.

Some implementations relate to a device. The device includes a processor; memory in electronic communication with the processor; and instructions stored in the memory, the instructions being executable by the processor to: access existing business intelligence models; automatically extract tables used in creating the existing business intelligence models and ground truth information for the existing business intelligence models; provide the tables and the ground truth information as input to a machine learning model; and train the machine learning model using the tables and the ground truth information to predict connections between pairs of tables and to output a graph with nodes of the graph representing each input table of the tables and edges of the graph representing the connections between pairs of tables.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

BRIEF DESCRIPTION OF THE DRAWINGS

FIG. 6 illustrates an example method for training a machine learning model in accordance with implementations of the present disclosure.

DETAILED DESCRIPTION

Business Intelligence (BI) is increasing in importance in modern enterprises for data driven decision making. BI is data driven using the data of the business (historical and current data) and helps users understand how a business is doing (e.g., analyzing sales, costs, margins, etc.). BI uncovers insights for making strategic decisions for businesses and aids users in making informed decisions for improving a business.

Traditionally, technical experts (e.g., database administrators) manually prepare BI-models (e.g., in star or snowflake schemas) that join tables in data warehouses, before less technical business users can run analytics using end user dashboarding tools. However, the popularity of self-service BI products in recent years has created a demand for less technical end users to build BI-models themselves without relying on database administrators or central information technology (IT) departments.

There are two main steps in any BI project: (1) building BI models, and (2) performing ad-hoc analysis using BI models (e.g., running queries using the BI models through user interfaces and dashboards). The first step of building BI models remains a pain point for non-technical users. Users may have to wait for a technical user to prepare the data for the BI model. Moreover, the data is constantly changing, and the BI models may not represent the current data for the business.

BI-modeling refers to the process preparing and establishing relationships between data, where a central task is to establish join relationships from a given set of input tables. BI-modeling typically leads to schema graphs, such as, star schema graphs or snowflake schema graphs, as illustrated in FIGS. 1A-1C.

Figure 1A:
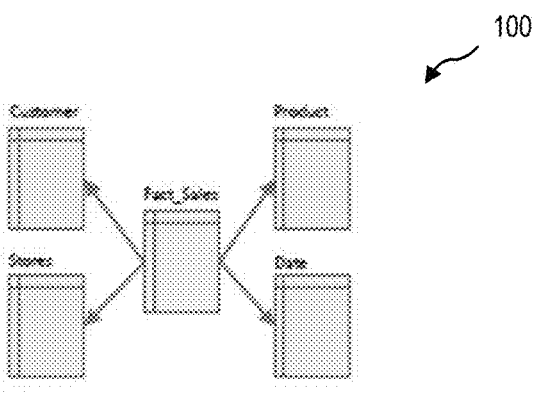
FIG. 1A illustrates an example of a star schema graph.

FIG. 1A illustrates an example star schema graph 100. A star-schema refers to the cases where there is one fact table, whose foreign-key columns refer to primary-key columns from one or more (non-hierarchical).

Figure 1B:
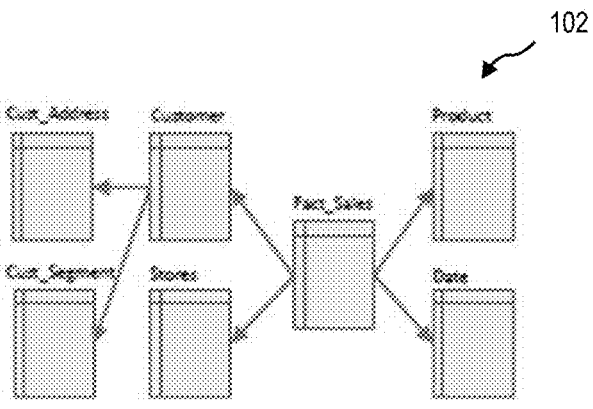
FIG. 1B illustrates an example of a snowflake schema graph.

FIG. 1B illustrates an example snowflake schema graph 102. The snowflake schema generalizes the star-schema, with dimension tables referring to each other in a hierarchically manner. For example, in the graph 102, the "Customer" dimension refers to a coarser grained dimension "Customer Segment". Similarly, an "Address" dimension can refer to a coarser grained "City", which in turn refers to "Country", etc.

Figure 1C:
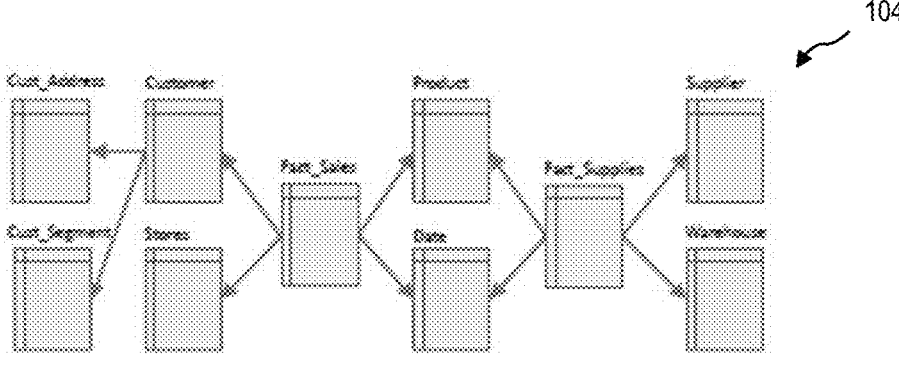
FIG. 1C illustrates an example of a constellation schema graph.

FIG. 1C illustrates an example constellation schema graph 104. While there is only one fact table in star and snowflake schemas, constellation schemas generalize to the cases with multiple fact tables.

The technical experts (database administrators) typically manually identify the join relationships between the data and generate the schema graphs for the data. The database administrators create links between the tables (arrows in the illustrated graphs) so the user can query the different tables (ask questions about the business). The database administrator figures out which tables are related, how the tables are related, and the technical specification to relate the tables together (field in common between the different tables). When faced with a large number of input tables, the task of identifying all possible join relationships is challenging and time consuming.

The methods and systems of the present disclosure automatically prepare BI models. The methods and systems automatically predict the join relationships for BI models and automatically generate a graph of the BI model. The methods and systems leverage a local join model trained offline to score the joinability of each pair of columns/tables using calibrated probabilities. The calibrated probabilities of the joinability of each pair of columns/tables are modeled as edges in a graph.

The methods and systems present the generated graph of the BI models to users. The automatically created BI models are used by the users for business analysis. For example, the users use the automatically generated BI models to run one or more queries for the business.

One technical advantage of the methods and systems of the present disclosure is automatically generating BI models for tables of data. Another technical advantage of the methods and systems of the present disclosure is a high level of accuracy for the predicted joins between pairs of tables in the BI models. Another technical advantage of the methods and systems of the present disclosure is reducing the latency in preparing the BI models. The methods and systems of the present disclosure automatically generate highly accurate BI models quickly without users specifying the join relations for the input tables manually. The method and systems of the present disclosure reduce a barrier of entry for users to create BI models for business data and use the created BI models for making strategic decisions for businesses for improving businesses.

Figure 2:
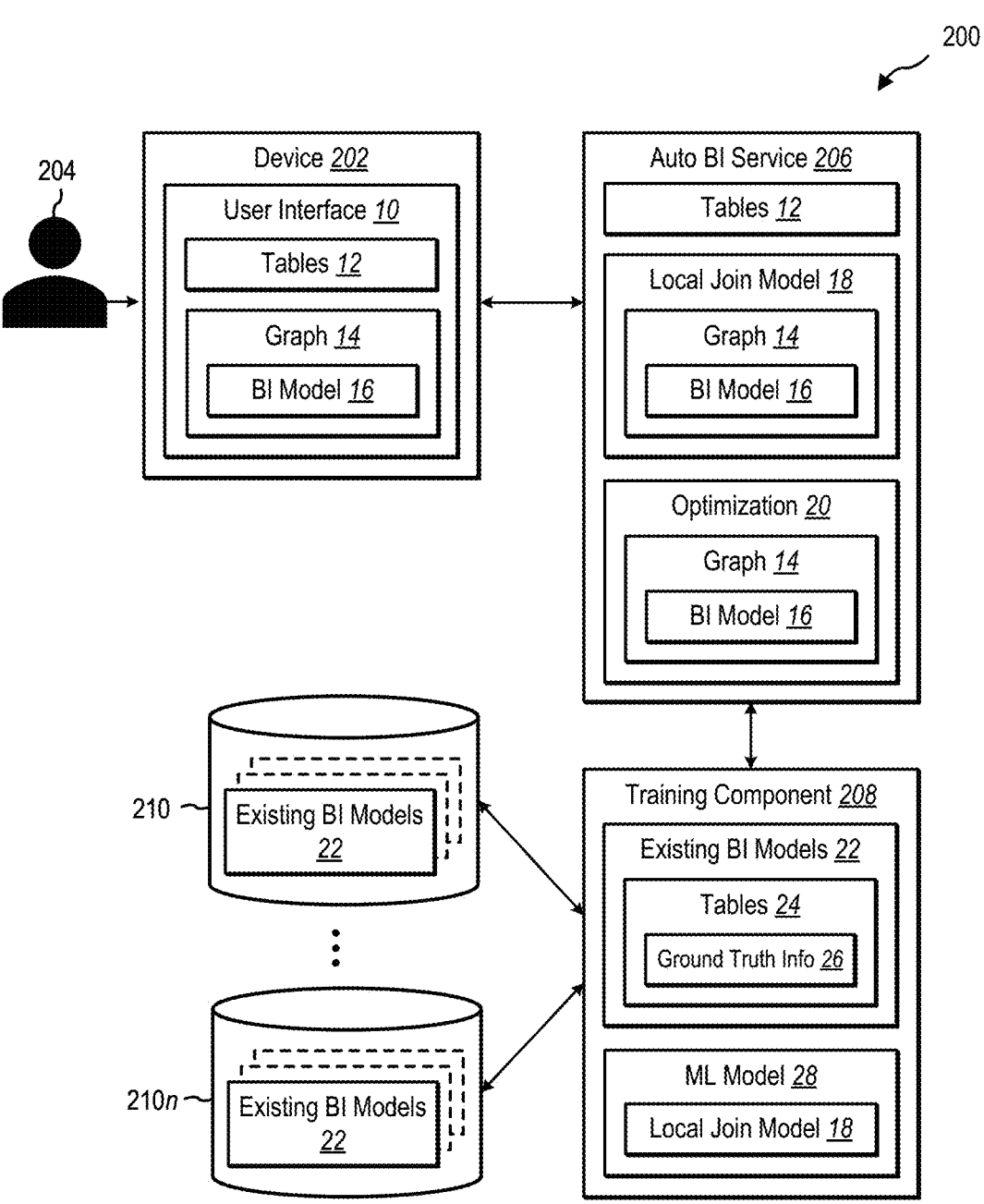
FIG. 2 illustrates an example environment for automatically creating BI models in accordance with implementations of the present disclosure.

Referring now to FIG. 2, illustrated is an example environment 200 for automatically creating BI models for data. A BI model is a data model that defines relationships between different data collected for the business and creates a visual representation of the data. The environment 200 includes an auto BI service 206 that automatically generates a BI model 16 for a plurality of tables 12.

The tables 12 includes data collected for a business or organization. In some implementations, the tables 12 include dimension tables. In some implementations, the tables 12 include fact tables. In some implementations, the tables 12 include fact tables and dimension tables. A fact table contains key metrics and measurements of business processes that one intends to analyze (e.g., revenue of sales transactions). In addition, a fact table contains foreign keys that can reference multiple dimension tables, where each dimension table contains detailed information associated with the measurements from a unique facet (e.g., a "Product" dimension table contains details of products sold, whereas a "Date" dimension table has detailed day/month/year info of transactions, etc.).

A user 204 accesses the auto BI service 206 through a user interface 10 of a device 202. In some implementations, the auto BI service 206 is on a server (e.g., a cloud server) remote from the device 202 of the user 204 accessed, for example, using the user interface 10 via a network. The network may include one or multiple networks that use one or more communication platforms or technologies for transmitting data. For example, the network may include the Internet or other data link that enables transport of electronic data between respective devices of the environment 200. In some implementations, the auto BI service 206 is local to the device 202.

In some implementations, the user 204 identifies the tables 12 to provide to the auto BI service 206. In some implementations, the tables 12 are automatically provided to the auto BI service 206. Each table 12 consists of a list of columns. The auto BI service 206 receives the tables 12 and provides the tables 12 as input to a local join model 18. The local join model 18 is trained to automatically predict, for a given pair of table columns, whether the two columns are likely joinable. The local join model 18 predicts a probability of joinability of each pair of tables in the tables 12. The local join model 18 scores the joinability of each pair of columns in the tables 12 using calibrated probabilities, which are modeled as edges in a graph 14. The local join model 18 outputs the graph 14 for the BI model 16 based on the predicted joinability of each pair of tables in the tables 12.

In some implementations, the graph 14 is a directed graph $G=(V, E)$, where V is a vertex in the graph 14 (the nodes) and E is an edge in the graph 14. Each input table T of the tables 12 is represented as a vertex $v$ $(T){\in}V$, and each possible join candidate between columns $(C_i, C_j)$ as a weighted edge $e_{ij}{\in}E$, where the edge weight $w(e_{ij})$ is the calibrated join probability $P(C_i, C_j)$ from the local join model 18, where P is the probability of joinability for the column pair $(C_i, C_j)$. A directed edge $e_{ij}r$ in the graph 14 represents N:1 joins, which from N-side (FK) columns $C_i$ to the 1-side (PK) columns $C_i$. The 1:1 joins are represented in the graph 14 as bi-directional edges.

The auto BI service 206 performs one or more optimizations 20 on the graph 14 and the BI model 16 and updates the graph 14 and the BI model 16 based on the optimizations 20. The optimizations 20 leverage graph properties and graph structure constraints in combination with the general shape of BI models to generate more accurate predictions for the connections (join relationships) between tables in the BI model 16. In some implementations, the optimizations 20 prune away improper edges (join relationships) between tables) in the graph 14. In some implementations, the optimizations 20 add edges (join relationships) between tables) in the graph 14.

In some implementations, the optimizations 20 includes a precision mode stage focused on finding the salient snowflake-like structures for the graph 14 representing the BI model 16. Given a graph $G=(V, E)$ where candidate joins are marked as edges, the auto BI service 206 wants to select edges (joins) $J \subseteq E$, such that: (a) the graph induced by J, $G'=(V, J)$, is a snowflake that connects all vertices in V; (b) if more than one such snowflake-structure exists, find the most probable snowflake, based on the joint-probability of all joins selected in J, $P(J)=\Pi_{e_{ij} \in J}P(C_i, C_j)$.

Examples equations that the auto BI service 206 uses to identify a most probable snowflake in the graph 14, if more than one snowflake exists in the graph 14, are illustrated below in equations (2) and (3).

$$(1 - MPS) \max_{J \subseteq E} \prod_{e_{ij} \in J} P(C_i, C_j) \qquad (2)$$

s.t.

$$G' = (V, J) \text{ is a snowflake.} \qquad (3)$$

The auto BI service 206 uses a structure in graph-theory called arborescence in performing the optimizations 20 on the graph 14. A directed graph $G=(V, E)$ is called an arborescence if there is a unique vertex $r \in V$ known as the root, such that there is exactly one directed path from r to every other $v \in V$, $v \neq r$. Equivalently, a directed graph G is an arborescence if all its vertices have in-degree of 1, except a unique root vertex $r \in V$ that has in-degree of 0.

In some implementations, instead of assigning join probability $P(C_i, C_j)$ as the edge weight for each edge $e_{ij}$, the auto BI service 206 uses equation (4) to perform a logarithmic conversion and set the edge weight of each $e_{ij}$.

$$w(e_{ij}) = -\log(P(C_i, C_j)) \qquad (4)$$

The auto BI service 206 uses equations (5) and (6) to find a minimum-cost-arborescence that finds a spanning arborescence (covering all vertices) in a directed graph G that has the smallest edge-weights.

$$\max_{J \subseteq E} \sum_{e_{ij} \in J} w(e_{ij}) \qquad (5)$$

-continued s.t.

$$G' = (V, J) \text{ is a arboresence} \qquad (6)$$

One example algorithm that the auto BI service 206 uses to construct the graph 14 is provided below in Algorithm 1.

| Algorithm 1: Construct graph with edge-weights |
|---|
| input :all input tables T in a BI-model |
| output :Graph G = (V, E) that represents T |
| 1  V ← {$v_T$\|T ∈ T}, with $v_T$ representing each T ∈ T |
| 2  E ← { } |
| 3  foreach $(C_i, C_j)$ satisfying Inclusion - Dependency in T do |
| 4     \|  $P(C_i, C_j)$ ← Local-Classifier $(C_i, C_j)$ |
| 5     \|  $w(e_{ij})$ ← −log($P(C_i, C_j)$) |
| 6     \|  E ← E ∪ {$e_{ij}$}, with edge-weight $w(e_{ij})$ |
| 7  return G(V, E) |

For a given set of input tables 12 (T), for which the BI model needs to be built, the auto BI service 206, in line 3 of the Algorithm 1, enumerates column pairs $(C_i, C_j)$ in T for which Inclusion-Dependencies (IND) holds approximately, which are possible joins that are considered in generating the graph 14. In line 4 of the Algorithm 1, the auto BI service 206 scores each $(C_i, C_j)$ in T using the local join model 18 to obtain calibrated probabilities $P(C_i, C_j)$, which are transformed in line 5 of the Algorithm 1 to become edge-weights $w(e_{ij})$. The auto BI service 206 can perform an optimization 20 on the graph 14 generated using the Algorithm 1 to generate a most probable arborescence (MPA) for the graph 14.

In some implementations, a plurality of snowflakes like structures exist the graph 14. The auto BI service 206 can perform optimizations 20 on the graph 14 to identify the most probable k (where k is a positive integer) snowflake like structures in the graph 14 and also infer the right number of snowflakes k. A directed graph $G=(V, E)$ is an k-arborescence if the underlying undirected graph has a total of k joint connected-components, written as {$G_i=(V_i, E_i)\|i \in [k]$}, such that $V_{i \in [k]}V_i=V, \cup_{i \in [k]} E_i=E$, where each $G_i$ is an arborescence for all $i \in [k]$.

The auto BI service 206 applies the k-arborescence structure during the optimization 20 to force the k underlying snowflakes to emerge from the graph 14. In some implementations, some desired joins may be missing in the k-arborescence snowflakes in the graph 14 in response to the optimization 20, which may be added during an additional optimization process on the graph 14.

In some implementations, the auto BI service 206 uses equations (7) and (8) to determine a correct k for the number of snowflake structures in the graph 14.

$$\max_{J \subseteq E, k \leq |V|} \sum_{e_{ij} \in J} w(e_{ij}) + (k - 1) \cdot p \qquad (7)$$

s.t.

$$G' = (V, J) \text{ is a } k\text{-arboresence} \qquad (8)$$

The parameter p effectively controls the number of snowflakes (e.g., a larger p would "penalize" having more disconnected snowflakes), the (k−1) are virtual edges, each with a parameterized edge-weight p, that connect the k connected components into one, such that a k-arborescence always has the same number of edges as 1-arboresences, regardless of k (because $(|V|-k)+(k-1)=(|V|-1)$). In some implementations, the auto BI service 206 sets p with a join-probability of exactly 0.5, which means a 50% chance of being joinable use $p=-\log(0.5)$ as our natural choice of penalty weight in k-MCA.

One example algorithm that the auto BI service 206 uses to construct the graph 14 with multiple snowflakes is provided below in Algorithm 2.

| Algorithm 2: Solve k-MCA for constellation schema |
|---|
| input :Graph G = (V, E) |
| output :optimal k-MCA (k-snowflakes) |
| 1   V' ← V ∪ {r} |
| 2   E' ← E ∪ {e(r, υ)\|υ ∈ V}, with w(e(r, υ)) = p |
| 3   $J_1^*$ ← solve 1-MCA on G' = (V', E') with Liu-Chu/Edmonds |
| 4   $J_k^* = J_1^* \setminus \{e(r, υ)\|υ \in V\}$ |
| 5   return $J_k^*$ |

Given a graph G=(V, E) on which k-MCA needs to be solved, the algorithm 2 introduces a new vertex r that is an "artificial root," and connects r with all v∈ V using edges e (r, v), with the edge weight w (e (r, v))=p. This leads to a new constructed graph G'=(V', E') where V'=V∪{r}, E'=E∪{e (r, v)\|v∈ V}.

The auto BI service 206 constructs a new graph G' by adding an artificial root r, which connects to all existing vertices vi with an edge e (r, vi) with the same penalty weight w(e)=p. The auto BI service 206 uses line 4 of the Algorithm 2 to solve the 1-MCA on G' and produces the optimal solution of $$J_1^*$$

that consists of the edges and may include artificial-edges connecting r with fact-tables. The auto BI service 206 uses line 4 of the Algorithm 2 to produce $$J_k^*$$

corresponding to of all edges (removing any artificial-edges connecting fact-tables to the artificial-root).

In some implementations, the optimization 20 that the auto BI service 206 performs is a cardinality-constraint (CC) on the graph 14. The cardinality-constraint applies an FK-once property that the same FK column in a fact-table should likely not refer to two different PK columns in two dimensional tables. In the graph 14, such a structure corresponds to two edges $(C_i, C_j)$, $(C_i, C_m)$, pointing from the same $C_i$ to two separate $C_j$ and $C_m$, which usually indicates that one of the joins is incorrect. For example, the same FK column "Customer-ID" in "Sales" table may appear joinable to the local join model 18 with both (1) the PK column "C-ID" of the "Customers" table, and (2) the PK "Customer-Segment-ID" of the "Customer-Segments" table (because both have high column header similarity and value-overlap). However, an FK should likely only join one PK (or otherwise there are two redundant dimension tables).

In some implementations, the auto BI service 206 uses equations (9), (10), and (11) to add the cardinality-constraint to the graph 14.

$$\max_{J \subseteq E, k \leq |V|} \sum_{e_{ij} \in J} w(e_{ij}) + (k-1) \cdot p \qquad (9)$$

s.t.

$$G' = (V, J) \text{ is a } k\text{-arboresence} \qquad (10)$$

$$i \neq l, \forall\, e_{ij} \in J, e_{lm} \in J, j \neq m \qquad (11)$$

Equation (11) is the new is the new FK-once constraint, which states that no two edges $e_{ij}$, $e_{lm}$ in the selected edge-set J should share the same starting column-index, or (i≠l).

One example algorithm that the auto BI service 206 uses to construct the graph 14 with the cardinality-constraint added is provided below in Algorithm 3. Algorithm 3 leverages the branch-and-bound principle and the sparsity of join edges from the same columns.

| Algorithm 3: Solve k-MCA-CC |
|---|
| input :Graph G = (V, E) |
| output :optimal solution to k-MCA-CC (k-snowflakes) |
| 1   J ← Solve-k-MCA(G) using Algorithm 2 |
| 2   if J is a feasible solution to k-MCA-CC(G)) then |
| 3    \|   return J |
| 4   else |
| 5    \|   $C_s$ ← edges in J with the same source column index s that violates FK-once constraint (Equation 12) |
| 6    \|   $C_s^1, C_s^2, \ldots C_s^{|C_s|}$ ← disjoint subsets of $C_s$, each with exactly one edge from $C_s$ |
| 7    \|   $E_i = E \setminus C_s \cup C_s^i, \forall i \in [|C_s|]$ |
| 8    \|   $G_i = (V, E_i) \forall i \in [|C_s|]$ |
| 9    \|   $J_i$ = Call Solve-k-MCA-CC($G_i$) recursively, $\forall i \in [|C_s|]$ |
| 10    \|   $J^* = \mathrm{argmin}_{J_i, i \in [|C_s|]}\, c(J_i)$ |
| 11   return J* |

In implementing the Algorithm 3, the auto BI service 206 first uses Algorithm 2 (line 1 of Algorithm 3) to solve the unconstrained version k-MCA and obtain J. The auto BI service 206 checks J constraint violations—if there is no violation, J is the optimal solution to k-MCA-CC. If there is a violation, let $C_s=\{e_{sj}, e_{sk}, \ldots\} \subseteq J$ be one set of conflicting edges in J from the same column (thus violating the FK-once constraint). The auto BI service 206 partitions Cs into \|Cs\| number of subsets $$C_s^1, C_s^2, \ldots, C_s^{|C_s|},$$

each with exactly one edge in $C_s$ (line 6 of the Algorithm 3). The auto BI service 206 constructs \|$C_s$\| number of k-MCA-CC problem instances, each with a new graph $G_i=(V_i, E_i)$, where $$V_i = V, E_i = E\setminus C_s \cup C_s^i.$$

The auto BI service 206 recursively solves k-MCA-CC on each graph $G_i$ to get $J_i$ (line 9 of the Algorithm 3). Let c (J) be the objective function in Equation (9), the $J_i$ that minimizes the cost function, $J^*=\mathrm{argmin}_{J_i}c(J_i)$, is the optimal solution to the original k-MCA-cc problem on G (line 10 of the Algorithm 3).

In some implementations, the optimizations 20 include a recall mode that finds additional joins that may not be included in the graph 14. The recall mode grows (e.g., adds) additional edges on the graph 14.

In some implementations, the auto BI service 206 uses an edge maximizing schema to select as many edges $S \subseteq R$, subject to certain graph-structure constraints, where and $R = \{e_{ij} | e_{ij} \in (E \backslash J^*), P(e_{ij}) \geq \tau\}$ is the remaining edges that are promising (meeting a precision threshold $\tau^5$) but not yet selected by $J^*$. For example, the auto BI service 206 uses equations (12), (13), and (14) for the edge maximizing schema to add additional edges to the graph 14.

$$\underset{S \subseteq R}{\operatorname{argmax}} |S| \qquad (12)$$

$$\text{s.t.}$$

$$i \neq l, \forall\, e_{ij}, e_{lm} \in S \cup J^*, e_{ij} \neq e_{lm} \qquad (13)$$

$$i \neq m, \forall\, e_{ij}, e_{jl}, e_{lm} \in S \cup J^* \qquad (14)$$

In the recall-mode, the auto BI service 206 solves the edge maximizing schema (EMS) using J* and obtain S*. The sub-graph induced by $J^* \cup S^*$ is the graph 14 provided with the BI model 16.

The auto BI service 206 provides the graph 14 and the BI model 16 to the device 202. The user interface 10 presents the graph 14 and the BI model 16 to the user 204. The graph 14 for the BI model 16 allows the user 204 to easily view the connections (e.g., the edges in the graph 14) between the tables in the tables 12 automatically created in the BI model 16. The user 204 may use the BI model 16 to run one or more queries for the business. The auto BI service 206 automatically prepares BI models for use by the users 204.

In some implementations, the user 204 modifies the BI model 16. One example of a modification includes the user 204 adding connections (e.g., adding edges to the graph 14) between tables (e.g., nodes in the graph 14) in the BI model 16. Another example of a modification includes the user 204 removing connections (e.g., removing edges of the graph 14) between tables (e.g., nodes in the graph 14) in the BI model 16. Another example includes the user 204 adding tables (e.g., adding nodes to the graph 14) to the BI model 16. Another example includes the user 204 removing tables (e.g., removing nodes in the graph 14) of the BI model 16. The user 204 may perform any modifications to the BI model 16 and may use the modified BI model 16 to run one or more queries for the business.

The auto BI service 206 receives the local join model 18 from a training component 208. The training component 208 performs the training offline using existing BI models 22 created by users (e.g., the users 204 of the environment 200 and other users). The training component 208 obtains a large set of existing BI models 22 from datastore 210. For example, the training component 208 obtains over a hundred thousand existing BI models 22 created by users for different businesses from the datastore 210 to use in the training of the local join model 18. In some implementations, the training component 208 obtains the existing BI models 22 from a plurality of datastores 210 (up to n, where n is a positive integer). The existing BI models 22 cover a variety of BI use cases, such as, financial reporting, inventory management, and/or sales.

The training component 208 automatically extracts the tables 24 from the existing BI models 22 and the ground truth information 26 for the tables 24. The ground truth information 26 is the connections (join relationships) between each pair of tables 24 that the users provided when creating the existing BI models 22. The existing BI Models 22 along with the tables 24 and the ground truth information

26 extracted for each existing BI model 22, is provided to a machine learning model 28 as training data.

One example of the training data is shown below in equation (15):

$$\{(C_i, C_j), L_{ij}\}, \qquad (15)$$

where $L_{ij}$ is the label for joinability and $(C_i, C_j)$ is a pair of columns in the tables 24. For example, $L_{ij}=1$ if $(C_i, C_j)$ joins in the ground truth information 26, and $L_{ij}=0$ otherwise. The machine learning model 28 featurizes $(C_i, C_j)$ both at the schema-level (e.g., column header similarity), and content-level (e.g., column value overlap) leading to a supervised machine learning formulation. The machine learning model 28 is trained to produce classifier scores to predict joinability for any column pair $(C_i, C_j)$. For example, a probability of 0.5 means the machine learning model 28 predicts that the two columns joining has a 50% chance of being correct.

The output of the machine learning model 28 is a local join model 18 trained to predict for any column pair, the probability of the pair being joinable. The local join model 18 is provided to the auto BI service 206 to use in predicting the BI model 16 for a new set of tables 12.

In some implementations, one or more computing devices (e.g., servers and/or devices) are used to perform the processing of the environment 200. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the user interface 10, the auto BI service 206, the training component 208, and the datastores 210 are implemented wholly on the same computing device. Another example includes one or more subcomponents of the user interface 10, auto BI service 206, the training component 208, and/or the datastores 210 are implemented across multiple computing devices. Moreover, in some implementations, the user interface 10, one or more subcomponent of the auto BI service 206, the training component 208, and/or the datastores 210 may be implemented and processed on different server devices of the same or different cloud computing networks.

In some implementations, each of the components of the environment 200 is in communication with each other using any suitable communication technologies. In addition, while the components of the environment 200 are shown to be separate, any of the components or subcomponents may be combined into fewer components, such as into a single component, or divided into more components as may serve a particular implementation. In some implementations, the components of the environment 200 include hardware, software, or both. For example, the components of the environment 200 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 200 include hardware, such as a special purpose processing device to perform a certain function or group of functions. In some implementations, the components of the environment 200 include a combination of computer-executable instructions and hardware.

Figure 3:
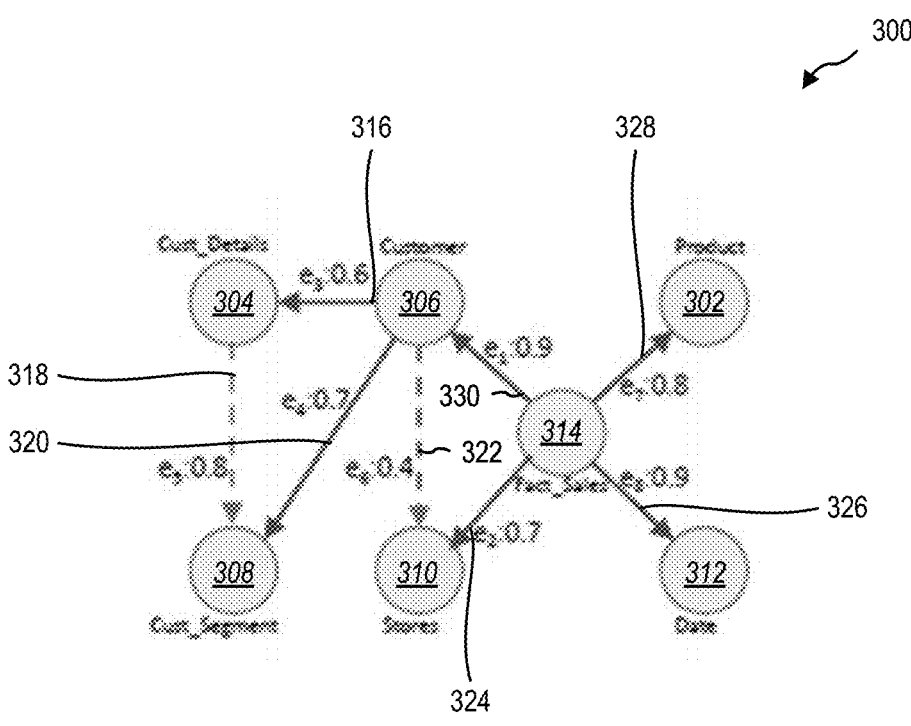
FIG. 3 illustrates an example of a graph generated representing a BI model automatically created in accordance with implementations of the present disclosure.

Referring to FIG. 3, illustrated is an example graph 300 (e.g., the graph 14 (FIG. 2) generated by the auto BI service 206 (FIG. 2) representing a BI model 16 (FIG. 2) automatically created by the auto BI service 206). The graph 300 provides a graph representation of the tables illustrated in FIG. 1B with join candidates as edges.

The graph 300 includes a plurality of nodes 302, 304, 306, 308, 310, 312, 314 and a plurality of edges 316, 318, 320, 322, 324, 326, 328, 330 ($e_1$, $e_2$, $e_3$, $e_4$, $e_7$, $e_8$). Each vertex of the graph 300 (e.g., the nodes 302, 304, 306, 308, 310, 312, 314) corresponds to a table from the input tables 12 (FIG. 2). The plurality of edges 316, 318, 320, 322, 324, 326, 328, 330 also include the determined probability of the joinability of the nodes generated by the local join model 18 (FIG. 2). The solid edges of the graph 300 (e.g., the edges 316, 320, 324, 326, 330) correspond to the ground truth information 26 (FIG. 2) in FIG. 1B (the joins provided by the users for the tables) and the dotted edges (e.g., the edges 318, 322) are additional edges generated by the local join model 18 (e.g., improper edges added by the local join model 18).

The dotted edge 318 (e5:0.8) represents a candidate join between the column "Customer-ID" (in table "Customer-Details"), and column "Customer-Segment-ID" (in table "Customer-Segments"). The column pair ("Customer-ID", "Customer-Segment-ID") should not join because the column pair refers to two semantically different types of IDs, which however appear like a plausible join to the local join model 18 (because of high name-similarity and value overlap), which leads to a high probability (the local-classifier score (0.8)). Thus, the dotted edges (e.g., the edges 318, 322) in the graph 14 refer to incorrect predictions generated by the local join model 18 (e.g., the dotted edges were not included in the ground truth information 26).

In some implementations, the auto BI service 206 performs one or more optimizations 20 on the graph 300 to remove the dotted edges (e.g., the edges 318, 322) prior to sending the graph 300 to the user 204 (FIG. 2) for presentation. For example, the auto BI service 206 performs the optimization 20 that uses the graph theory of MCA to enforce a snowflake like shape on the graph 300 to improve the BI model 16 by identifying and removing the improper edges (e.g., the edges 318, 322) from the graph 300. In some implementations, the auto BI service 206 uses the transformation in the equation (4) and constructs an instance of 1-MCA on the graph 300, where all edge-weights are now $w(e_{ij}) = -\log (P(C_i, C_j))$. $J^* = \{e_1, e_2, e_3, e_4, e_7, e_8\}$ is the minimizer of equation (4) in 1-MCA, with the smallest objective value $-(\log (0.9) + \log (0.7) + \log (0.6) + \log (0.7) + \log (0.8) + \log (0.9))$, which can be efficiently solved using the Chu-Liu/Edmonds' algorithm. The auto BI service 206 provides the updated graph 300 representing the BI model 16 (e.g., the graph 300 removes the dotted edges 318, 322) to the user 204 to view and/or use in preparing queries on the BI model 16.

Figure 4:
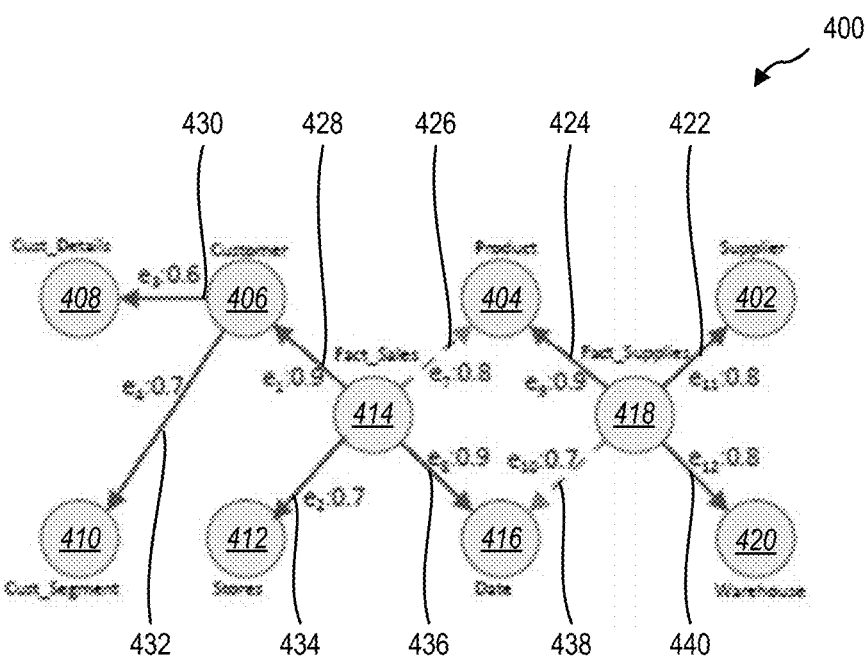
FIG. 4 illustrates an example of a graph generated representing a BI model automatically created in accordance with implementations of the present disclosure.

Referring now to FIG. 4, illustrated is an example graph 400 (e.g., the graph 14 (FIG. 2) generated by the auto BI service 206 (FIG. 2) representing a BI model 16 (FIG. 2) automatically created by the auto BI service 206). The graph 400 provides a graph representation of the constellation (multi-snowflake) of the tables illustrated in FIG. 1C with join candidates as edges. The sub-graph with the solid edges, is a 2-arborescence because both of its two connected-components are arborescences.

The graph 400 includes a plurality of nodes 402, 404, 406, 408, 410, 412, 414, 416, 418, 420 and a plurality of edges 422, 424, 426, 428, 430, 432, 434, 436, 438, 440 ($e_1$, $e_2$, $e_3$, $e_4$, $e_1$, $e_8$, $e_9$, $e_{10}$, $e_{11}$, $e_{12}$). Each vertex of the graph 400 (e.g., the nodes 402, 404, 406, 408, 410, 412, 414, 416, 418, 420) corresponds to a table from the input tables 12 (FIG. 2). The plurality of edges 422, 424, 426, 428, 430, 432, 434, 436, 438, 440 also include the determined probability of the joinability of the nodes generated by the local join model 18 (FIG. 2). The solid edges of the graph 400 (e.g., the edges 422, 424, 428, 430, 432, 434, 436, 440) correspond to the ground truth information 26 (FIG. 2) in FIG. 1C (the joins provided by the users for the tables) and the dotted edges (e.g., the edges 426, 438) are edges that were not generated by the local join model 18 but were included in the ground truth information 26.

In some implementations, the auto BI service 206 performs one or more optimizations 20 on the graph 400. For example, the auto BI service 206 performs a recall mode optimization on the graph 400 to identify the missing joins (e.g., the dotted edges 426, 438) in the graph 400 and add the missing edges to the graph 400. The auto BI service 206 provides the graph 400 with the BI model 16 to the user 204 to view and/or use in preparing queries on the BI model 16.

Figure 5:
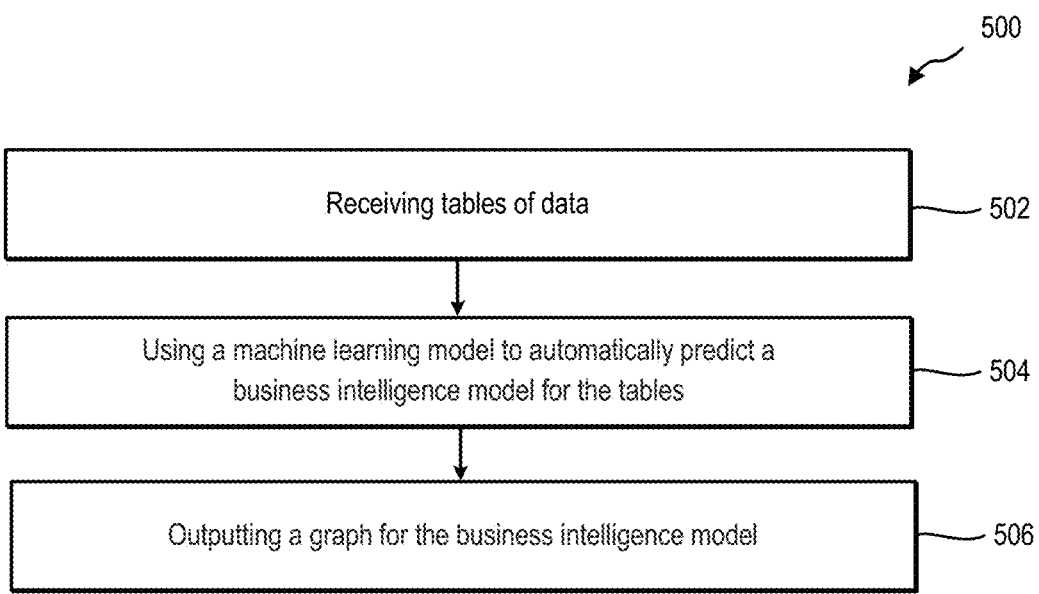
FIG. 5 illustrates an example method for automatically creating BI models in accordance with implementations of the present disclosure.

Referring now to FIG. 5, illustrated is an example method 500 for automatically creating BI models. The method 500 is discussed below with reference to FIGS. 2-4.

At 502, the method 500 includes receiving tables of data. The tables 12 includes data collected, for example, for a business or organization. In some implementations, the tables 12 include dimension tables. In some implementations, the tables 12 include fact tables. In some implementations, the tables 12 include fact tables and dimension tables. In some implementations, the auto BI service 206 receives the tables 12 from a user 204. For example, the user 204 uses the user interface 10 to identify the tables 12 to send to the auto BI service 206. In some implementations, the auto BI service 206 automatically receives the tables 12. A company or organization may select an option to automatically send the tables 12 to the auto BI service 206. For example, the tables 12 are automatically sent to the auto BI service 206 periodically (e.g., every week). Another example includes the tables 12 are automatically sent to the auto BI service 206 in response to the data changing in the tables 12 (e.g., as data is added or removed from the tables 12).

At 504, the method 500 includes using a machine learning model to automatically predict a business intelligence model for the tables. The BI model 16 defines relationships between the data. The auto BI service 206 receives the tables 12 and provides the tables 12 as input to a local join model 18. In some implementations, the local join model 18 is trained offline to predict a probability of joinability of each pair of tables in the tables 12 of data and the probability of joinability is used in creating the edges of the graph 14.

The local join model 18 is trained to automatically predicts, for a given pair of table columns, whether the two columns are likely joinable. The local join model 18 scores the joinability of each pair of columns in the tables 12 using calibrated probabilities, which are modeled as edges in a graph 14.

At 506, the method 500 includes outputting a graph for the business intelligence model. The local join model 18 outputs the graph 14 for the BI model 16 based on the predicted joinability of each pair of tables in the tables 12. The graph 14 includes nodes that represent each input table of the tables 12 of data and edges that represent weighted edges joining pairs of tables together. In some implementations, the graph 14 includes the probability of joinability presented on the edges of the graph 14.

In some implementations, the auto BI service 206 performs one or more optimizations 20 using graph properties on the graph 14 and updates the graph 14 and the BI model 16 based on the optimizations 20 prior to outputting the graph 14. The auto BI service 206 uses the graph properties to enforce a structure on the graph 14 to perform the optimizations 20 of the graph 14. One example graph property includes a minimum cost arborescence. Another example graph property includes an edge maximizing schema. Another example graph property includes a cardinality constraint. In some implementations, the optimization 20 includes adding edges to the graph. In some implementations, the optimization 20 includes removing edges from the graph.

The auto BI service 206 provides the graph 14 and the BI model 16 to the device 202. The user interface 10 presents the graph 14 representing the BI model 16 to the user 204. The graph 14 allows the user 204 to easily view the connections (e.g., the edges in the graph 14) between the tables in the tables 12 automatically created in the BI model 16. The user 204 may use the BI model 16 to run one or more queries for the business.

The method 500 automatically prepares BI models for use by the users 204 to use in business analysis without the users 204 manually identifying the connections between the tables 12.

Referring now to FIG. 6, illustrated is an example method 600 for training a machine learning model. The method 600 is discussed below with reference to FIGS. 2-4.

At 602, the method 600 includes accessing a plurality of existing business intelligence models. A training component 208 is used to train a machine learning model 28 to output a local join model 18. In some implementations, the training component 208 performs the training offline using existing BI models 22. The existing BI models 22 are created by users (e.g., the user 204 and other users).

The training component 208 obtains a large set of existing BI models 22 from the datastore 210. For example, the training component 208 obtains over a hundred thousand existing BI models 22 created by users for different businesses from the datastore 210 to use in the training of the local join model 18. In some implementations, the training component 208 obtains the existing BI models 22 from a plurality of datastores 210 (up to n, where n is a positive integer). The existing BI models 22 cover a variety of BI use cases, such as, financial reporting, inventory management, and/or sales.

At 604, the method 600 includes automatically extracting tables used in creating the existing business intelligence models and ground truth information for the existing business intelligence models. The training component 208 automatically extracts the tables 24 from the existing BI models 22 and the ground truth information 26 for the tables 24. The ground truth information 26 is the connections (join relationships) between each pair of tables 24 that the users provided when creating the existing BI models 22.

At 606, the method 600 includes providing the tables and the ground truth information as input to a machine learning model. The existing BI Models 22 along with the tables 24 and the ground truth information 26 extracted for each existing BI model 22, are provided to a machine learning model 28 as training data.

At 608, the method 600 includes training the machine learning model using the tables and the ground truth information to predict connections between pairs of tables and to output a graph with nodes of the graph representing each input table of the tables and edges of the graph representing the connections between pairs of tables.

In some implementations, the machine learning model 28 uses column header similarities between columns in the tables 24 in predicting the connections between the pairs of tables. In some implementations, the machine learning model 28 uses context similarities between columns in the tables 24 in predicting the connections between the pairs of tables. The output of the machine learning model 28 is a trained local join model 18 that is trained to predict for any column pair, the probability of the pair being joinable. In some implementations, the local join model 18 is trained to provide classifier scores that predict a probability of joinability for any column pair of the tables 24. The local join model 18 is provided to the auto BI service 206 to use in predicting the BI model 16 for a new set of tables 12.

Figure 7:
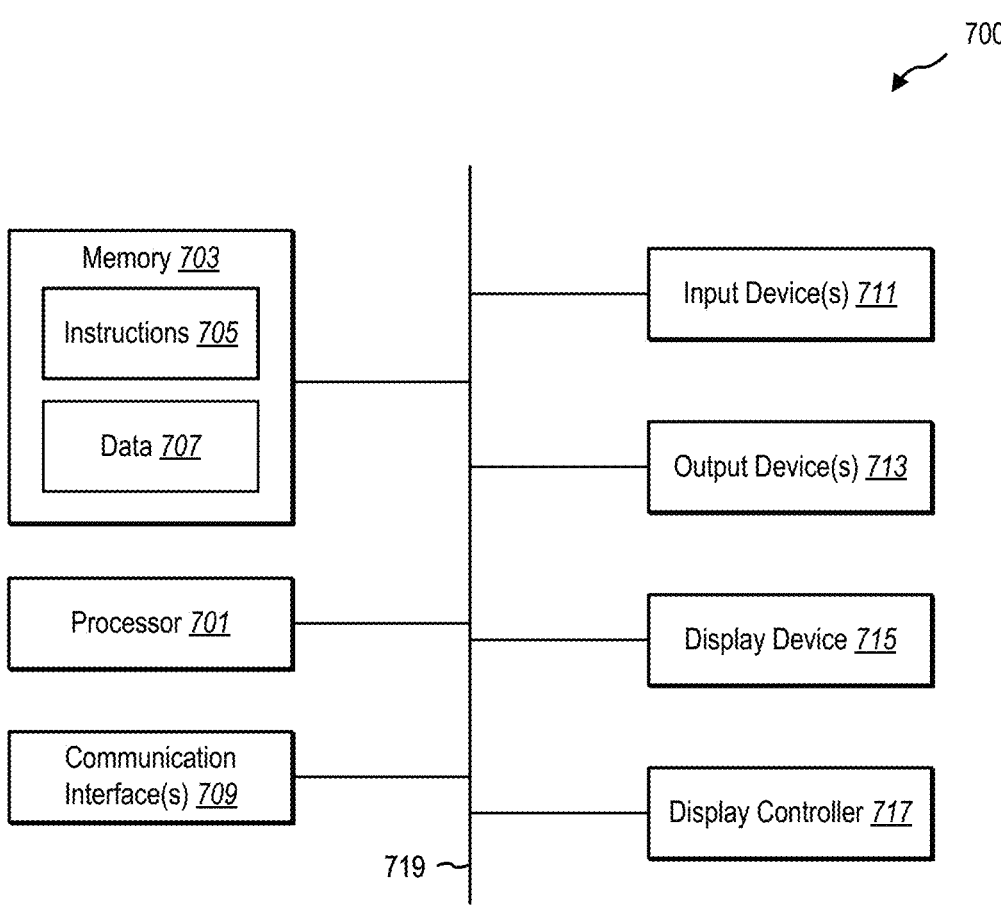
FIG. 7 illustrates components that may be included within a computer system.

FIG. 7 illustrates components that may be included within a computer system 700. One or more computer systems 700 may be used to implement the various methods, devices, components, and/or systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

In some implementations, the various components of the computer system 700 are implemented as one device. For example, the various components of the computer system 700 are implemented in a mobile phone or tablet. Another example includes the various components of the computer system 700 implemented in a personal computer.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

receiving tables of data;

using a machine learning model to automatically predict a business intelligence model for the tables by predicting a probability of joinability of each pair of table columns in the tables, wherein the business intelligence model defines relationships between the data and the probability of joinability of a pair of table columns is used in creating edges of a graph;

outputting the graph for the business intelligence model using the probability of joinability, wherein the graph is constructed in a general snowflake structure using an equation that uses the probability of joinability in identifying nodes and edges of the graph and the nodes of the graph represent each input table of the tables of data and the edges of the graph represent weighted edges joining pairs of tables together;

using the machine learning model to perform an optimization leveraging graph properties and a general shape of business intelligence models to generate accurate predictions of join relationships between the tables in the business intelligence model, wherein the optimization enforces the snowflake structure and identifies and removes improper edges from the predicted probability of joinability in the graph; and outputting the graph based on modifications from the optimization.

2. The method of claim 1, wherein the machine learning model is trained offline to predict the probability of joinability of each pair of tables in the tables of data.

3. The method of claim 2, wherein the graph further includes the probability of joinability presented on the edges of the graph.

4. The method of claim 1, further comprising:

performing an optimization of the graph using graph properties.

5. The method of claim 4, wherein the graph properties enforce a structure on the graph to perform the optimization of the graph.

6. The method of claim 5, wherein the graph properties include a minimum cost arborescence, an edge maximizing schema, or a cardinality constraint.

7. The method of claim 4, wherein the optimization includes adding edges to the graph.

8. The method of claim 4, wherein the optimization includes removing edges from the graph.

9. The method of claim 1, further comprising:

performing a recall mode optimization on the graph identifying missing joins from the predicted probability of joins in the graph; and adding the missing joins as edges to the graph.

10. A device, comprising:

a processor;

memory in electronic communication with the processor; and instructions stored in the memory, the instructions being executable by the processor to:

receive tables of data;

use a machine learning model to automatically predict a business intelligence model for the tables by predicting a probability of joinability of each pair of table columns in the tables, wherein the business intelligence model defines relationships between the data and the probability of joinability of a pair of table columns is used in creating edges of a graph;

output the graph for the business intelligence model using the probability of joinability, wherein the graph is constructed in a general snowflake structure using an equation that uses the probability of joinability in identifying nodes and edges of the graph and the nodes of the graph represent each input table of the tables of data and edges of the graph represent weighted edges joining pairs of tables together;

use the machine learning model to perform an optimization leveraging graph properties and a general shape of business intelligence models to generate accurate predictions of join relationships between the tables in the business intelligence model, wherein the optimization enforces the snowflake structure and identifies and removes improper edges from the predicted probability of joinability in the graph; and output the graph based on modifications from the optimization.

11. The device of claim 10, wherein the machine learning model is trained offline to predict a probability of joinability of each pair of tables in the tables of data and the probability of joinability is used in creating the edges of the graph.

12. The device of claim 11, wherein the graph further includes the probability of joinability presented on the edges of the graph.

13. The device of claim 10, wherein the instructions are further executable by the processor to perform an optimization of the graph using graph properties.

14. The device of claim 13, wherein the graph properties enforce a structure on the graph to perform the optimization of the graph.

15. The device of claim 14, wherein the graph properties include a minimum cost arborescence, an edge maximizing schema, or a cardinality constraint.

16. The device of claim 13, wherein the instructions are further executable by the processor to perform the optimization on the graph by adding edges to the graph or removing edges from the graph.

\* \* \* \* \*